United States Patent
Setsuda et al.

[11] Patent Number: 6,106,350
[45] Date of Patent: Aug. 22, 2000

[54] METHOD OF INSULATING STEM PINS OF A CATHRODE RAY TUBE

[75] Inventors: Takashi Setsuda, Aichi; Hirokazu Kanno, Mie; Kazuhiko Tomaru, Gunma; Tsutomu Yoneyama, Gunma; Hisaharu Yamaguchi, Gunma, all of Japan

[73] Assignees: Sony Corporation; Shin-Etsu Chemical Co., Ltd., both of Tokyo, Japan

[21] Appl. No.: 09/366,211

[22] Filed: Aug. 2, 1999

[30] Foreign Application Priority Data

Aug. 4, 1998 [JP] Japan .................................. 10-220004

[51] Int. Cl.[7] ...................................................... H01J 9/34
[52] U.S. Cl. ................................................................ 445/23
[58] Field of Search .................................. 445/22, 23, 34

[56] References Cited

U.S. PATENT DOCUMENTS

| | | | |
|---|---|---|---|
| 4,217,014 | 8/1998 | Piascinski et al. | 445/6 |
| 6,045,428 | 4/2000 | Anderson et al. | 445/60 |

FOREIGN PATENT DOCUMENTS

| | | | |
|---|---|---|---|
| 7-94100 | 4/1995 | Japan | H01J 9/30 |
| 8-11191A | 4/1996 | Japan | H01J 29/92 |

*Primary Examiner*—Kenneth J. Ramsey
*Attorney, Agent, or Firm*—Ronald P. Kananen; Rader, Fishman & Grauer

[57] ABSTRACT

A method of insulating a cathode ray tube and enabling an electrical insulator to be produced without material loss and enabling improvement of the bonding strength between a stem and a stem base, which comprises a base through which pin through holes are formed and has provided projecting from the front surface thereof a tip holder, in a state with the stem pins inserted through the pin through holes and the tip held in the tip holder, said method comprising the steps of molding an electrical insulator composition comprising an uncured self-adhesive silicone rubber into a predetermined sheet shape by using a transfer mold to obtain an electrical insulator, arranging the electrical insulator in a state extending from the positions of the pin through holes on the back of the base of the stem base to the tip holder and adhering it to the back of the base, folding the portion of the electrical insulator extending to the tip holder to the inside surface of the tip holder, and attaching the stem base to the stem.

2 Claims, 7 Drawing Sheets

METHOD OF INSULATING STEM PINS OF A CATHRODE RAY TUBE

BACKGROUND OF THE INVENTION

1. Field of the Invention

The present invention relates to a method of insulating a cathode ray tube used for electrical equipment having high voltage electrodes, in particular color television receivers, video and computer monitors, etc., applied to the insulation between stem pins to which a high voltage is supplied and to an electrical insulator composition for a cathode ray tube used for insulation between high voltage stem pins of a cathode ray tube and between other electrodes to which a high voltage is supplied.

2. Description of the Related Art

Generally, as shown in FIGS. 1B and 1C, a stem 20 is integrally attached to a neck of a cathode ray tube by fusing together the glass at is periphery and the glass around the end edge of the neck 1a. A stem base 30 is attached to the stem 20. The stem 20 is provided with a plurality of stem pins 21 at its periphery serving as electrodes in a predetermined pin circle shape and with a tip 22 projecting from its center portion. Note that the illustration of the stem pins 21 is omitted in FIG. 1C.

The stem base 30 is made of a polycarbonate or other plastic having an excellent insulating property and comprises, as shown in FIGS. 1A, 1B, and 2, a circular base 31, a tip holder 32 provided at the center portion of the base 31 for holding the tip 22 of the stem 20, a sector-shaped stem pin holder 33 provided on the base 31 in a state also serving as a part of a side wall of the tip holder 32 for holding the high voltage stem pins 21, and a skirt portion 34 extending downward from the peripheral edge of the base 31. The base 31 is formed, corresponding to the stem pins 21, with pin through holes 35 through which the stem pins 21 are inserted at the time of attaching the stem base 30 to the stem 20.

As a method of the related art for electrical insulation between the stem pins 21 of the stem 20 to which the stem base 30 is attached, a method of interposing an electrical insulator 40 shown in FIGS. 3A and 3B between the stem 20 and the stem base 30 as shown in FIG. 1B is known. The electrical insulator 40 is formed as a thick disk shape and is formed at its center portion with a tip through hole 41 for inserting the tip 22 of the stem 20. Further, pin through holes 42 through which all of the stem pins 21 including the high voltage stem pins are inserted at the time of placing the electrical insulator 40 on the stem 20 are formed corresponding to the stem pins 21.

The electrical insulator 40 is prepared by, for example in Japanese Unexamined Patent Publication (Kokai) No. 8-111191, extruding into a tape shape a viscous electrical insulator composition comprising 100 parts by weight of a silicone compound having an electrical insulation property plus 2 parts by weight of a silane coupling agent and 1.5 parts by weight of an organic peroxide (hereinafter referred to as the "insulator composition") and punching out a disk shape using a die set. Further, Japanese Unexamined Patent Publication (Kokai) No. 7-94100 discloses a method of obtaining an electrical insulator by molding a viscous insulator comprising a silicone compound similar to the above publication into a flat plate of a large area and punching out disk shapes by a molding tool.

In both publications, first, the electrical insulator 40 shown in FIG. 4A is adhered to the back of the base 31 of the stem base 30 shown in FIG. 4B as shown in FIG. 4C. Then, the stem pins 21 are inserted through the pin through holes 42 of the electrical insulator 40 and the pin through holes 35 of the stem base 30 and the tip 22 is inserted through the tip through hole 41 of the electrical insulator 40 and the tip holder 32 of the stem base 30. In that state, the stem base 30 is attached to the stem 20 of the cathode ray tube 1, then pressed and heated to bond it so as to achieve electrical insulation between the stem pins 21.

Summarizing the problems to be solved by the present invention, in the inventions disclosed in Japanese Unexamined Patent Publication (Kokai) Nos. 8-111191 and 7-94100, however, since both punch out disk shapes from an insulator composition of a tape shape or a flat plate shape by a die set or a molding tool, the portion remaining after punching becomes wasted, that is, there is a disadvantage of a loss of the material loss.

Also, because the disk is produced by punching, it is difficult to mold the electrical insulator into a shape corresponding to a complicatedly shaped stem or stem base of a cathode ray tube. As a result, it ends up allowing air to become entrained between the stem base and the stem at the time of attaching the two. When air is entrained, disadvantages are caused such as a decline in the insulation property between the stem pins 21 due to the entrained air, an inability to draw out 100% of the electrical characteristics of the cathode ray tube, and insufficient bonding force between the stem and the stem base.

Note that since it is difficult to mold an electrical insulator into a complicated shape in the related art as explained above, an electrical insulator of substantially the same size as the base of the stem base has been prepared to provide insulation between all stem pins projecting from the stem. However, in actuality, it is possible to achieve sufficient electrical characteristics of the cathode ray tube by just insulation between the high voltage stem pins among the plurality of stem pins.

SUMMARY OF THE INVENTION

An object of the present invention is to provide a method of insulating a cathode ray tube enabling production of an electrical insulator without loss by efficiently using the electrical insulator composition.

Another object of the present invention is to provide a method of insulating a cathode ray tube enabling easy molding of an electrical insulator into a shape corresponding to a complicatedly shaped stem and stem base of the cathode ray tube by transfer molding and thereby enabling attachment of the stem base to the stem without entrainment of air.

A still other object of the present invention is to provide an electrical insulator composition for a cathode ray tube which is very effective in realizing a cathode ray tube improved in bonding of the stem and the stem base and improved in the insulation property between the high voltage stem pins by the above method of insulating a cathode ray tube.

According to a first aspect of the present invention, there is provided a method of insulating a cathode ray tube for insulation between stem pins using an electrical insulator when attaching to a stem, which is provided at the cathode ray tube and has a tip and stem pins projecting therefrom, an insulating stem base, which comprises a base through which pin through holes are formed and has provided projecting from the front surface thereof a tip holder, in a state with the stem pins inserted through the pin through holes and the tip held in the tip holder, comprising the steps of molding an electrical insulator composition comprising an uncured self-adhesive silicone rubber into a predetermined sheet shape by using a transfer mold to obtain an electrical insulator, arranging the electrical insulator in a state extending from the positions of the pin through holes on the back of the base of the stem base to the tip holder and adhering it to the back of the base, folding back the portion of the electrical insulator extending to the tip holder to the inside surface of the tip holder, and attaching the stem base to the stem.

According to the above aspect of the present invention, since an electrical insulator composition is molded by using a transfer mold (hereinafter the molding will be referred to as "transfer molding") to obtain an electrical insulator, there is no loss of the electrical insulator composition such as when obtaining an electrical insulator by using a die set or molding tool. Also, due to the transfer molding, it becomes possible to easily mold the electrical insulator into a shape corresponding to the complicatedly shaped stem and stem base of the cathode ray tube. Further, since the electrical insulator is arranged in a state extending from the positions of the pin through holes toward the tip holder when adhering it to the back of the base of the stem base, and since the portion of the electrical insulator extending to the tip holder is folded back to the inside surface of the tip holder prior to attaching the stem base to the stem, the entrainment of air can be suppressed at the time of attaching the stem base to the stem.

According to a second aspect of the present invention, there is provided an electrical insulator composition for a cathode ray tube comprising an uncured self-adhesive silicone rubber, wherein the uncured self-adhesive silicone rubber comprises, with respect to 100 parts by weight of a silicone compound, 0.001 to 15 parts by weight of a bonding aid and 0.01 to 5 parts by weight of a vulcanization agent and has a Williams plasticity adjusted to 100 to 300.

According to the above aspect of the present invention, since 0.001 to 15 parts by weight of a bonding aid is added to the silicone compound, an electrical insulator composition achieving a bondability effectively and having an excellent releasability from the transfer mold when used for transfer molding can be obtained. Also, since 0.01 to 5 parts by weight of a vulcanization agent is added, an electrical insulator composition having an excellent rubber strength and enabling work using this electrical insulator composition to be performed with good work efficiency is obtained. Furthermore, since the composition is adjusted to a Williams plasticity of 100 to 300, the releasability from the transfer mold is excellent when using the electrical insulator composition for transfer molding and the composition can be easily molded into a complicated shape. Accordingly, an electrical insulator composition comprising a silicone compound to which an adhesive and vulcanization agent are added in the above ranges has an excellent releasability from a transfer mold, is easily molded into a complex shape, is easy to handle and is otherwise extremely suited to transfer molding, and has an excellent rubber strength.

According to a third aspect of the present invention, there is provided an electrical insulator composition for a cathode ray tube comprising an uncured adhesive silicone rubber, wherein the uncured adhesive silicone rubber comprises, with respect to 100 parts by weight of a silicone compound, 0.001 to 15 parts by weight of a bonding aid, 0.1 to 10 parts by weight of a cross-linking agent, and 0.0001 to 1 part by weight of a platinum compound and has a Williams plasticity adjusted to 100 to 300.

According to the above aspect of the present invention, since 0.001 to 15 parts by weight of a bonding aid is added to the silicone compound, an electrical insulator composition achieving a bondability effectively and having an excellent releasability from the transfer mold when used for transfer molding can be obtained. Also, since 0.1 to 10 parts by weight of a cross-linking agent is added, an electrical insulator composition having a predetermined hardness and an excellent insulation property can be obtained and, since 0.0001 to 1 part by weight of a platinum compound is added, an electrical insulator composition which cures by a suitable curing rate can be obtained. Further, since the compound is adjusted to a Williams plasticity of 100 to 300, the releasability from the transfer mold is excellent when using the electrical insulator composition for transfer molding and the composition can be easily molded into a complicated shape. Accordingly, an electrical insulator composition comprising a silicone compound to which bonding aid, cross-linking agent, and platinum compound are added in the above ranges has an excellent releasability from a transfer mold, is easily molded into a complex shape, is extremely suited to transfer molding, cures at a suitable curing rate, and has an excellent insulation property.

BRIEF DESCRIPTION OF THE DRAWINGS

These and other objects and features of the present invention will become clearer from the following description of the preferred embodiments given with reference to the accompanying drawings, in which:

FIGS. 1A to 1C are views of a neck of a cathode ray tube of the related art where insulation is provided between stem pins, wherein FIG. 1A is a perspective view, FIG. 1B is a sectional view along the line E—E in FIG. 1A, and FIG. 1C is a sectional view of the stem;

FIGS. 3A and 3B are views of an example of an electrical insulator of the related art, wherein FIG. 3A is a perspective view and FIG. 3B is a sectional view along the line F—F in FIG. 3A;

FIGS. 4A to 4C are views for explaining a method of insulating a cathode ray tube of the related art, wherein FIG. 4A is a perspective view of an electrical insulator, FIG. 4B is a perspective view of a stem base, and FIG. 4C is a perspective view of a state where the electrical insulator is attached to the stem base;

FIGS. 5A to 5D are views for explaining a molding step in a method of insulating a cathode ray tube according to an embodiment of the present invention, wherein FIG. 5A is a sectional view of a transfer mold at the time of molding, FIG. 5B is a plan view of the transfer mold in an opened state in the plane shown by the line A—A of FIG. 5A, FIG. 5C is a plan view of FIG. 5B in a state with one of the two mandrels in FIG. 5B removed, and FIG. 5D is a plan view of an electrical insulator taken out from the transfer mold;

FIGS. 6A and 6B are views of an electrical insulator obtained by the molding step according to the embodiment, wherein FIG. 6A is a perspective view and FIG. 6B is a sectional view along the line B—B in FIG. 6A;

FIGS. 7A to 7C are explanatory views of an adhering step and a folding step according to the embodiment, wherein FIG. 7A is a perspective view of a stem base and FIGS. 7B and 7C are views of FIG. 7A from the direction of the line C in the adhering step and the folding step; FIG. 8B is a sectional view along the line D—D in FIG. 8A.

DESCRIPTION OF THE PREFERRED EMBODIMENTS

Figure 1A:
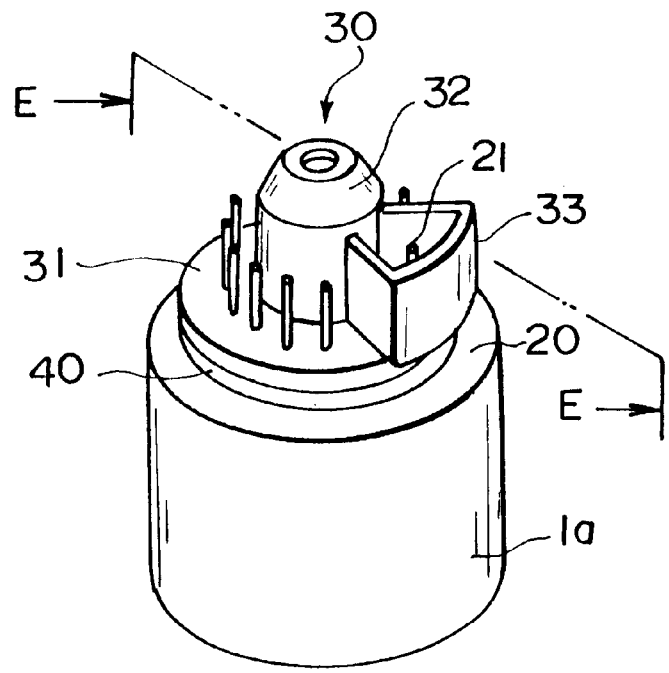

Below, preferred embodiments of a method of insulating a cathode ray tube and an electrical insulator composition of a cathode ray tube of the present invention will be described based on the accompanying drawings.

FIRST EMBODIMENT

First, prior to the explanation of the method of insulating a cathode ray tube of an embodiment of the present invention for insulating between stem pins of a stem provided at a neck of the cathode ray tube by providing an electrical insulator between the stem and the stem base attached thereto, an explanation will be given of an electrical insulator composition (hereinafter, referred to as an "insulator composition") of the electrical insulator used in the embodiment.

The insulator composition according to the present invention is comprised of an uncured self-adhesive silicone rubber used for transfer molding. An insulator composition of a first embodiment is comprised by adding 0.001 to 15 parts by weight of a bonding aid and 0.01 to 5 parts by weight of a vulcanization agent to 100 parts by weight of the uncured adhesive silicone rubber and has a Williams plasticity adjusted to 100 to 300.

As the above silicone compound, specifically a diorganopolysiloxane of the following average composition formula (1) to which various fillers, additives, and pigments have been added can be used.

$$R_nSiO_{(4-n)/2} \quad (1)$$

where, R indicates a substituted or unsubstituted monovalent hydrocarbon group and n is a positive value from 1.95 to 2.05.

Here, in the above formula (1), R is preferably a substituted or unsubstituted $C_1$ to $C_{10}$ monovalent hydrocarbon group, specifically, a methyl group, ethyl group, propyl group, or other alkyl group, a cyclopentyl group, cyclohexyl group, or other cycloalkyl group, a vinyl group, allyl group, or other alkenyl group, a cycloalkenyl group, phenyl group, tolyl group, or other aryl group, or a halogenated hydrocarbon group or cyanated hydrocarbon group comprised of these groups with hydrogen atoms partially substituted by a chlorine atom or cyano group or other organic group.

Generally, as a silicone compound, one where the backbone of the above diorganopolysiloxane is comprised of dimethylpolysiloxane units, one where the backbone of the above dimethylpolysiloxane has a phenyl group, vinyl group, γ-trifluoropropyl group, etc. introduced, etc. are suitable. Note that the polymerization degree of the diorganopolysiloxane is preferably 100 or more, more preferably 300 to 10,000. This is because if the polymerization degree is less than 100, the mechanical strength of the cured silicone compound declines and the moldability becomes poor in some cases, while if it exceeds 10,000, the fluidity of the silicone compound declines and the moldability becomes poor in some cases.

As the various fillers, additives, pigments, etc. able to be added to the diorganopolysiloxane, for example, silica hydrogel (hydrous silicic acid), silica aerogel (anhydrous silicic acid-fumed silica), and other reinforcing silica fillers, clay, calcium carbonate, diatomaceous earth, titanium dioxide, and other fillers, low molecular siloxane esters (for example, dimethylsilane dimethylester), silanol (for example, diphenylsilanediol), and other dispersants, iron oxide, cerium oxide, iron octylate, and other agents for improving heat resistance, platinum compounds for imparting fire retardance, etc. may be mentioned. These may be added to and mixed with the diorganopolysiloxane alone or in combinations of two or more types in accordance with need in the usual amounts.

The bonding aid, a component of the insulator composition of the first embodiment, is an important component for making the electrical insulator formed from the insulator composition as explained later bond with the glass cathode ray tube, metal stem pins, and plastic stem base. As a bonding aid, for example, ones of the chemical formulas (2) to (12) below are used:

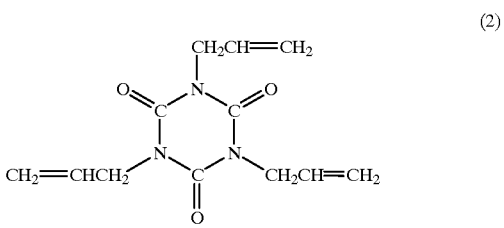

(2)

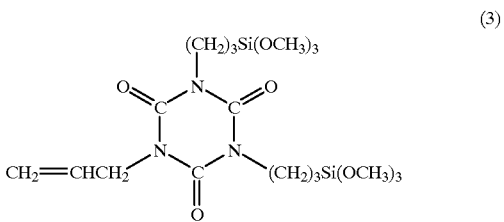

(3)

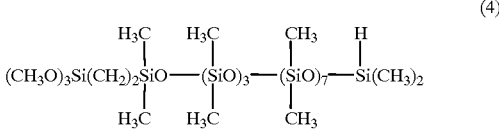

(4)

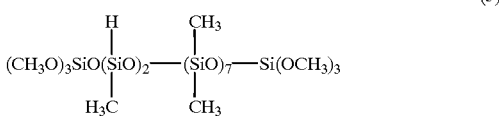

(5)

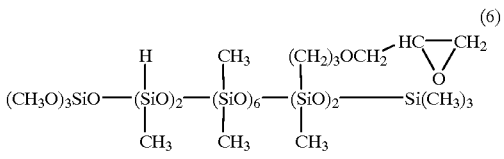

(6)

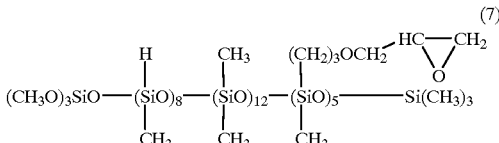

(7)

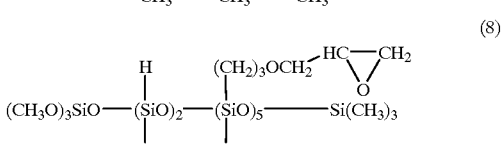

(8)

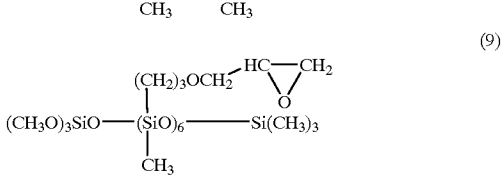

(9)

-continued

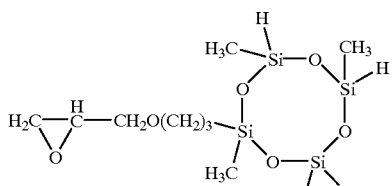
(10)

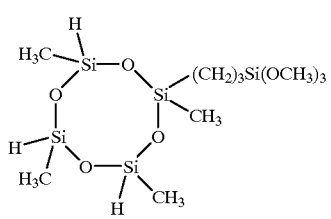
(11)

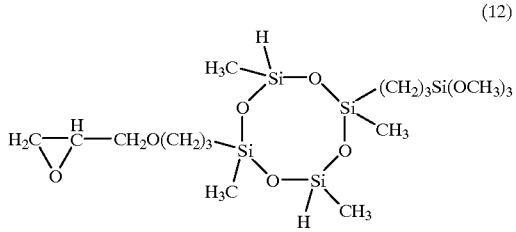
(12)

The amounts of these bonding aids added differ depending on the type of the bonding aid used, but normally, as mentioned earlier, 0.001 to 15 parts by weight is added with respect to 100 parts by weight of the silicone compound. The amount was made at least 0.001 part by weight since the effect of bonding is not sufficiently manifested when less than 0.001 part by weight is added. Further, the upper limit of the amount added was made 15 part by weight since the bonding strength does not change even if more than 15 parts by weight and, moreover, disadvantages arise in the processability, for example, problems arise in the releasability from the transfer mold used in the later explained molding step. More preferably, 0.01 to 10 parts by weight may be added with respect to 100 parts by weight of the silicone compound.

The vulcanization agent, another component of the insulator composition of the first embodiment, is added to make the silicone compound cure. As the vulcanization agent, for example, an organic peroxide is used. In particular, a diacyl peroxide is preferable. As examples of a diacyl peroxide, p-methylbenzoyl peroxide, o-methylbenzoyl peroxide, m-methylbenzoyl peroxide, benzoyl peroxide, 2,4-dichlorobenzoyl peroxide, octanoyl peroxide, decanoyl peroxide, lauryl peroxide, etc. may be mentioned. Among these, use of p-methylbenzoyl peroxide and o-methylbenzoyl peroxide, which make the work efficiency excellent since they enable ordinary pressure steam vulcanization, is optimal. At this time, it is possible to use either one of the p-methylbenzoyl peroxide and o-methylbenzoyl peroxide or possible to add both as the vulcanization agent.

The amount of the vulcanization agent added is preferably, as mentioned above, 0.01 to 5 parts by weight with respect to 100 parts by weight of the silicone compound. This range is made preferable because if less than 0.01 part by weight, the vulcanization becomes insufficient and the rubber strength declines, while if more than 5 parts by weight, the resultant insulator composition cures too fast and the work efficiency in the series of steps for insulating the cathode ray tube declines.

When producing the insulator composition, the silicone compound plus the bonding aid and vulcanization agent are kneaded by a twin-roll or other kneader. By doing this, an insulator composition of a cathode ray tube comprised of an uncured self-adhesive silicone rubber can be obtained. At this time, it is preferable that the Williams plasticity of the insulator composition be adjusted to 100 to 300. This is because if the Williams plasticity is less than 100, the releasability from the transfer mold is poor, while if the Williams plasticity exceeds 300, though the releasability from the transfer mold is good, molding into a complicated shape becomes difficult.

As explained above, the insulator composition of the first embodiment is one comprised of a silicone compound to which is added a bonding aid in a range where the bondability is effectively manifested and the releasability from the transfer mold used in the molding step is excellent and is one to which is added a vulcanization agent in a range where the rubber strength is good and the series of steps for insulating the cathode ray tube can be performed with a good work efficiency. Further, since the Williams plasticity is adjusted to a Williams plasticity giving a good releasability from the transfer mold and enabling easy molding into a complex shape, the composition is extremely suited to transfer molding.

Therefore, according to the first embodiment, an insulator composition is obtained which enables an electrical insulator having an excellent rubber strength and of a desired shape for insulating the cathode ray tube to be easily obtained by the transfer molding step and which enables the transfer molding step and the following folding step etc. to be carried out with a good work efficiency.

SECOND EMBODIMENT

An insulator composition comprised of an uncured self-adhesive silicone rubber of the second embodiment differs from that of the first embodiment in that instead of a vulcanization agent, a cross-linking agent, a platinum compound, and a control agent are added. That is, it is comprised of 0.001 to 15 parts by weight of bonding aid, 0.1 to 10 parts by weight of a cross-linking agent, 0.0001 to 1 part by weight of a platinum compound, and not more than 1 part by weight of a control agent added with respect to 100 parts by weight of the silicone compound and has a Williams plasticity adjusted to 100 to 300.

As the above cross-linking agent, for example, a polysiloxane having a hydrogen atom bonded with a silicon atom in its molecule may be mentioned. As examples, there are the organohydrogen polysiloxanes of the following chemical formulas (13) and (14).

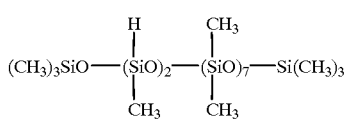
(13)

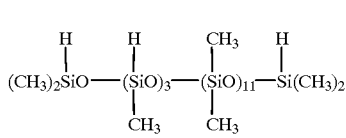
(14)

The amount of this cross-linking agent added is, as mentioned above, preferably 0.01 to 10 parts by weight with respect to 100 parts by weight of the silicone compound. This is because if less than 0.01 part by weight, the composition does not cure to the necessary hardness, while if over 10 parts by weight, bubbles etc. occur in the insulator composition and the insulation property declines—which is disadvantageous in obtaining an electrical insulator for insulating a high voltage.

The above platinum compound, a component of the insulator composition of the second embodiment, acts as a catalyst for an addition reaction of hydrogen to the vinyl group of the silicone compound and the organohydrogen polysiloxane and is comprised of, for example, chloroplatinic acid and its derivatives. Preferably, the amount added is, as explained above, 0.0001 to 1 part by weight with respect to 100 parts by weight of the silicone compound. This range is preferable because if less than 0.0001 part by weight, the curing becomes slower and the curability otherwise becomes poor resulting in time required for the curing and even if more than 1 part by weight, the curability does not change, so there is a cost disadvantage.

As the control agent, another component of the insulator composition of the second embodiment, for example acetylene alcohol and following chemical formula (15) are typical. As explained above, not more than 1 part by weight with respect to 100 parts by weight of the silicone compound is suitable. This is because when more than 1 part by weight, the curing becomes slower and disadvantages arise like the work efficiency in the series of steps in the method of insulating the cathode ray tube, in particular, the releasability from the transfer mold, becomes poor. Note that the control agent is an optional component. Therefore, it is possible to configure the insulator composition by eliminating the control agent from the insulator composition of the second embodiment. However, by adding a control agent, there are the advantages that the curing time can be adjusted, the durability can be increased, and furthermore long-term storage becomes possible.

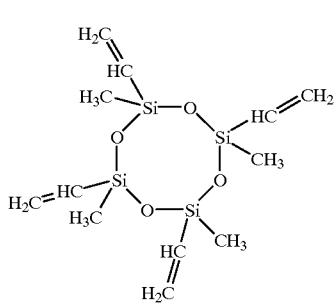

(15)

When producing the insulator composition of the second embodiment as well, by kneading the silicone compound plus the bonding aid, cross-linking agent, platinum compound, and control agent by a twin-roll or other kneader, an insulator composition is obtained comprising an uncured self-adhesive silicone rubber in which the Williams Plasticity is adjusted to 100 to 300.

The insulator composition of the second embodiment configured in this way is one comprised of a silicone compound to which is added a cross-linking agent in a range giving the desired hardness and an excellent insulation property and is one to which a platinum compound is added in a range enabling curing at a suitable curing rate and to which a control agent is added in a range not affecting the curing rate and the release from the transfer mold. Further, in the insulator composition of the second embodiment as well, since the composition is adjusted to a Williams plasticity giving an excellent releasability from the transfer mold and enabling easy molding to a complex shape, the composition is extremely suited to transfer molding.

Therefore, according to the second embodiment, a insulator composition is obtained which cures at a suitable curing rate and is excellent in insulation property and which enables an electrical insulator of a desired shape for insulating the cathode ray tube to be easily obtained by the transfer molding step and enables the transfer molding step and the subsequent folding step etc. to be performed with a good work efficiency.

THIRD EMBODIMENT

Next, an embodiment of a method of insulating a cathode ray tube according to the present invention will be explained based on a method of insulating a cathode ray tube using an electrical insulator comprised of the insulator composition of the first and second embodiments.

In the method of the present invention, first, as shown in FIG. 5, a molding step is carried out for obtaining an electrical insulator by using a transfer mold to mold the insulator composition of the first and second embodiments into a predetermined sheet shape.

Figure 5A:
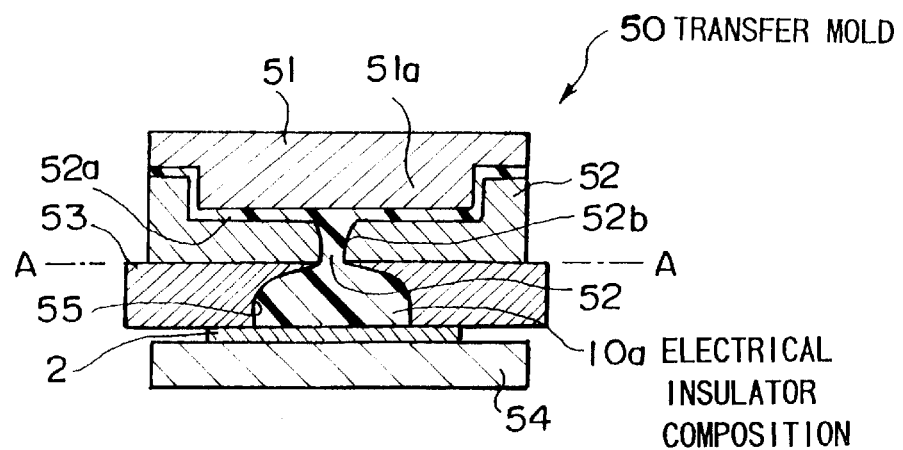
Figure 5B:
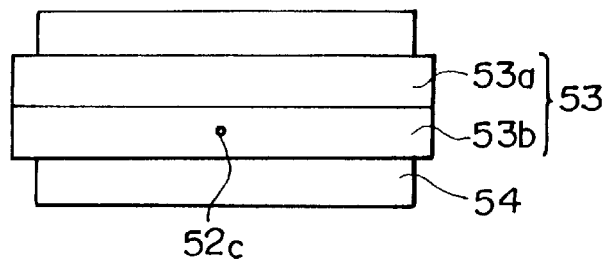
Figure 5C:
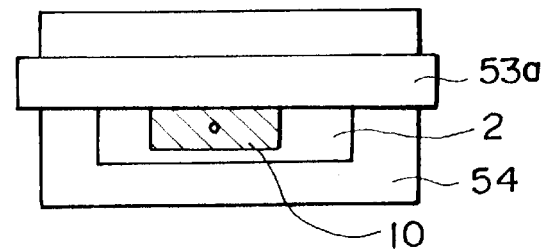
Figure 5D:
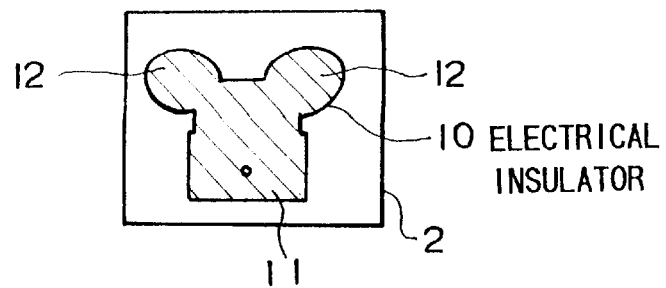
Figure 6A:
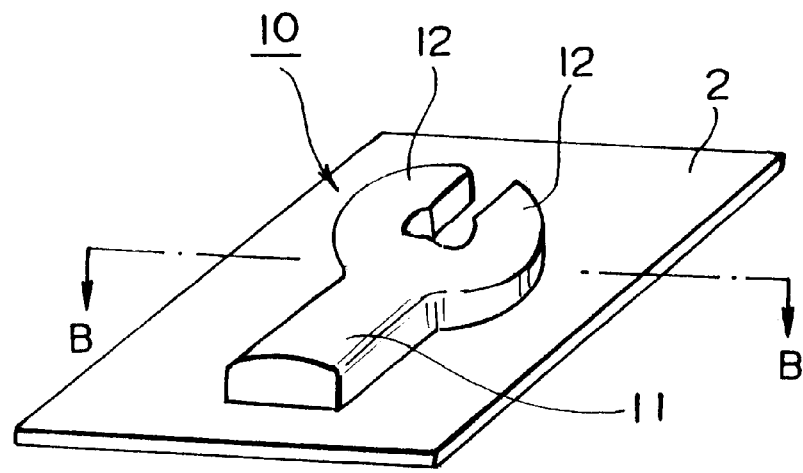
Figure 6B:
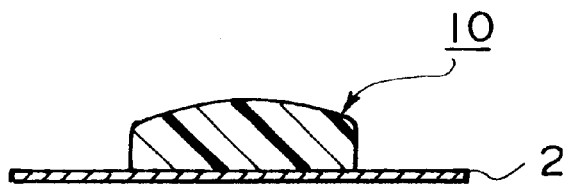

FIGS. 5A to 5D are views for explaining the molding step of the method of insulating a cathode ray tube according to the embodiment. FIG. 5A is a sectional view of a transfer mold during the molding, FIG. 5B is a plan view of the transfer mold in an opened state in the plane shown by the line A—A in FIG. 5A, FIG. 5C is a plan view of a state with one of the two mandrels in FIG. 5B removed, and FIG. 5D is a plan view of an electrical insulator taken out from the transfer mold. FIGS. 6A and 6B are views of an electrical insulator obtained by the molding step according to the first embodiment. FIG. 6A is a perspective view, and FIG. 6B is a sectional view along the line B—B in FIG. 6A.

As shown in the figures, the transfer mold 50 is configured provided with a plunger mold 51, a pot mold 52, a mandrel 53, and a lower mold 54. The lower mold 54 and the mandrel 53 arranged above it form a cavity corresponding to the outer shape of an electrical insulator 10 to be molded. The mandrel is configured by a combination of a pair of left and right mandrel parts 53a and 53b.

At the top side of the pot mold 52 arranged above the mandrel is formed a concave pot 52a to which the insulator composition 10 is supplied. Further, a sprue 52b serving as an injection path for the insulator composition 10a is formed at the pot mold 52 in a state reaching from the pot 52a to the cavity 55 of the mandrel 53. An end of the sprue 52b opening at the lower surface of the pot mold 52 becomes a gate 52c and enables the insulator composition 10a to be injected into the cavity 55. Further, the lower portion of the plunger mold 51 arranged above the pot mold 52 is provided with a plunger 51a of a shape substantially fitting with the pot 52a.

When molding the electrical insulator 10 using such a transfer mold 50, first a release sheet 2 of an area sufficiently covering the cavity 55 is arranged between the lower mold 54 and the mandrel 53 and the pot mold 52 is arranged above the mandrel 53. The release sheet 2 is comprised of, for example, a plastic film, is provided at one side of the obtained electrical insulator 10, and is removed at the time of adhering the electrical insulator 10 to a stem base as explained below. The sheet 2 is also designed to prevent deformation when taking out the molded electrical insulator 10 from the transfer mold.

Next, the insulator composition 10a which is heated in advance for lowering its viscosity is charged into the preheated pot 52a, the plunger mold 51 is pushed down, and the insulator composition 10a is therefore injected into the cavity 55 from the pot 52a via the sprue 52b and the gate 52c. Then, after holding this for a predetermined time to cause it to cure, the shaped article of the insulator composition 10a, that is, an electrical insulator 10, is taken out from the transfer mold 50. One side of the electrical insulator 10 is provided with the release sheet 2 as shown in FIG. 5D and FIGS. 6A and 6B.

Here, as an example of the electrical insulator 10, one for insulating between two adjoining stem pins to which a high voltage is applied, among a plurality of stem pins provided on the stem, is molded. Also, part of the electrical insulator 10 is to be folded in the later mentioned folding step to the inside surface of the tip holder of the stem in the state with the other part adhered to a base of the stem base.

Therefore, the electrical insulator 10 is molded to a substantial Y-shape in a plan view comprised of a folding portion 11 of a substantially rectangular shape in a plan view and an adhesive portion 12 branched into two from one end. The folding portion 11 to be folded to the inside surface of the tip holder and the part of the adhering portion 12 close to its trunk are molded to a state with the approximate center in the lateral direction bulging out further than its two sides as shown in FIG. 6B so that the folded portion will match with the curved inside surface of the tip holder.

Figure 2:
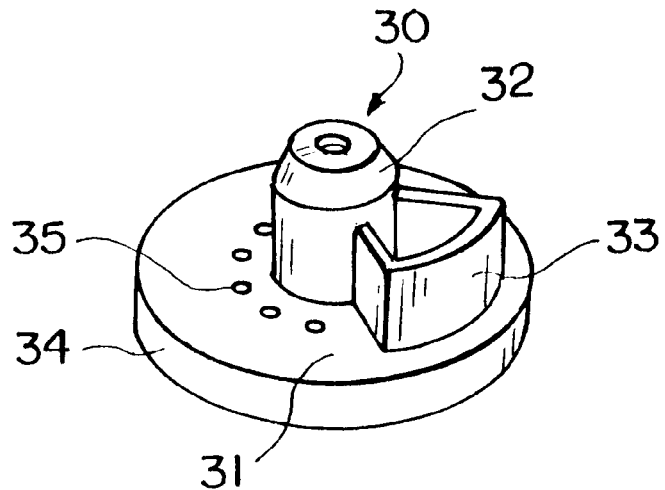
FIG. 2 is a perspective view of an example of a stem base of the related art.
Figure 3A:
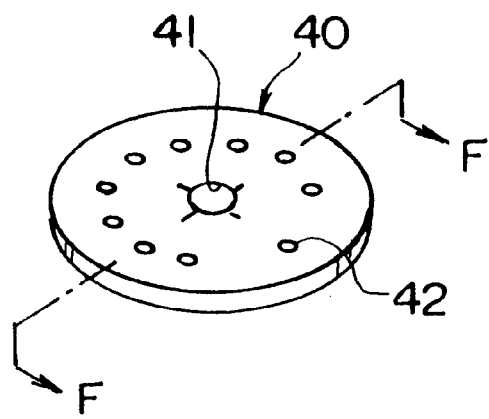
Figure 3B:
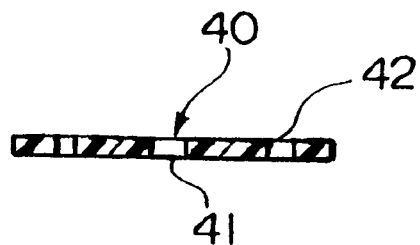
Figure 4A:
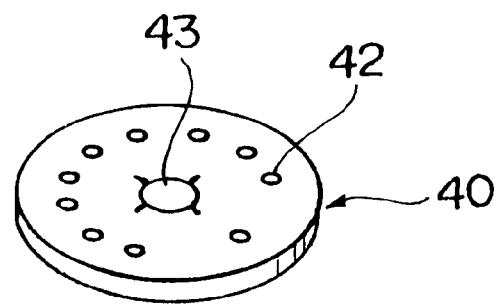
Figure 4B:
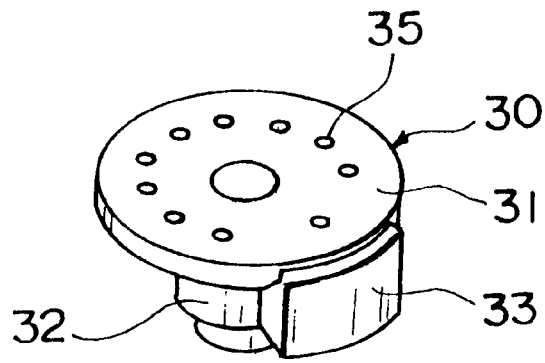
Figure 4C:
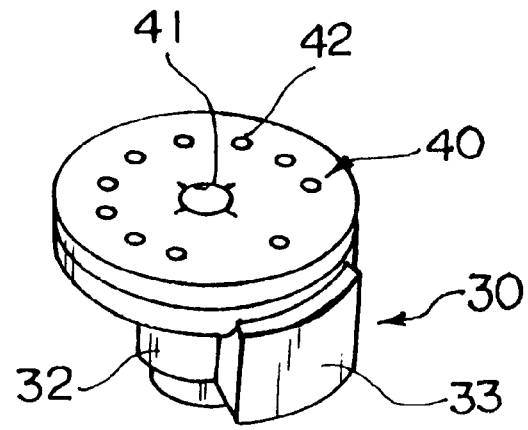
Figure 7A:
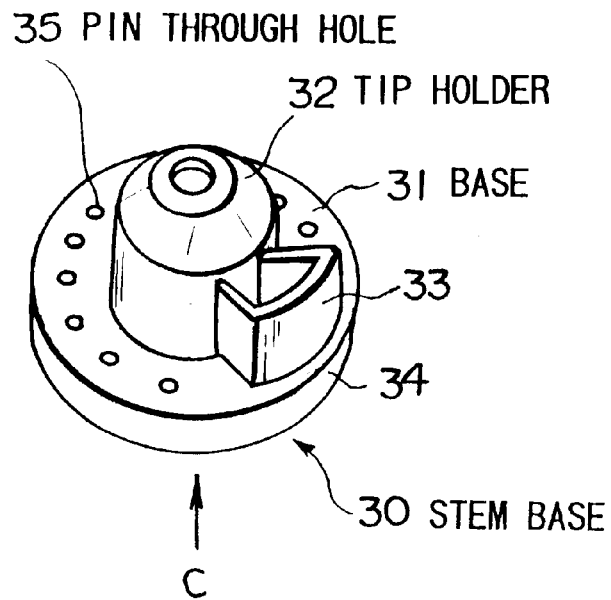
Figure 7B:
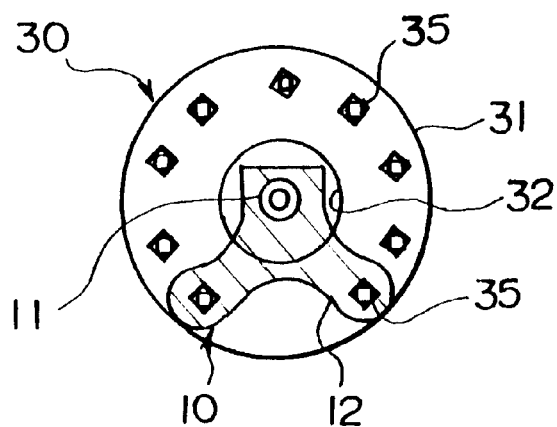
Figure 7C:
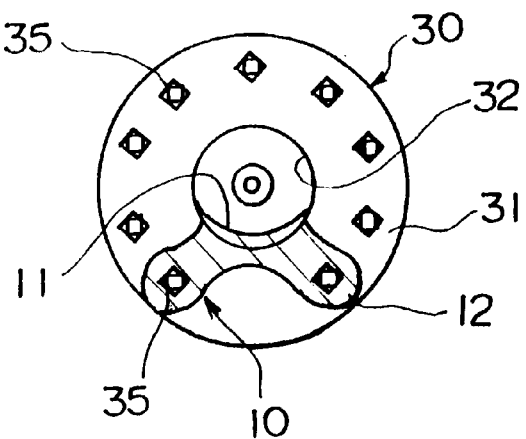

After obtaining the electrical insulator 10 in this way, an adhering step for adhering the adhering portion 12 of the electrical insulator 10 to the back of the base of the stem base and a folding step for folding the folding portion 11 of the electrical insulator 10 to the inside surface of the tip holder are performed. FIGS. 7A to 7C are explanatory views of the adhering step and the folding step according to an embodiment. FIG. 7A is a perspective view of the stem base, while FIGS. 7B and 7C are back views of FIG. 7A seen from the C line direction. Note that for the stem base 30, one structured in the same way as that in the related art shown in FIG. 2 is used, therefore the same components are given the same reference numerals in FIGS. 7A to 7C and explanations thereof are omitted.

Namely, in the adhering step, as shown in FIG. 7B, the adhering portion 12 of the electrical insulator 10 is adhered to the back of the base 31 of the stem base 30 with the release sheet 2 facing up. At this time, the adhering portion 12 of the electrical insulator 10 is arranged at positions of predetermined pin through holes 35 through which high voltage use stem pins will be inserted, the folding portion 11 is arranged in a state extending to the tip holder 32 of the stem base 30, and the adhering portion 12 is adhered to the positions of the predetermined pin through holes 35 in this state. At the time of adhesion, a predetermined pressure is applied to the electrical insulator 10 from above the sheet 2 to make it fit tight against the stem base 30. Then, the sheet 2 is peeled off.

Next, the electrical insulator 10 is pressed to straighten out its shape. By straightening out its shape, the subsequent folding step can be more easily performed and the folding portion 11 of the electrical insulator 10 can be reliably arranged at the desired position. Then, as shown in FIG. 7C, the folding step for folding the folding portion 11 of the electrical insulator 10 extending to the tip holder 32 of the stem base 30 to the inside surface of the tip holder 32 is performed.

Figure 1B:
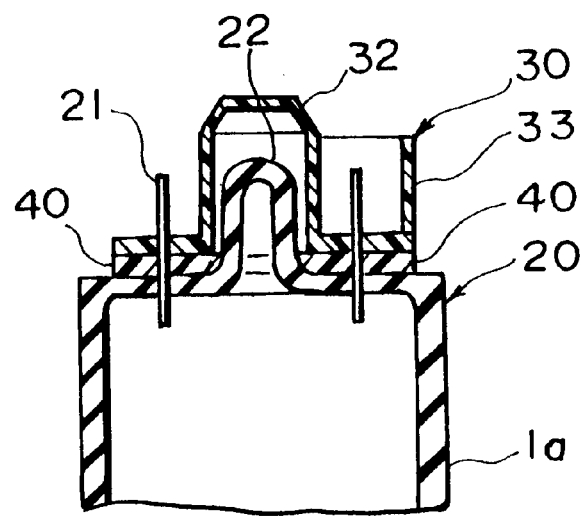
Figure 1C:
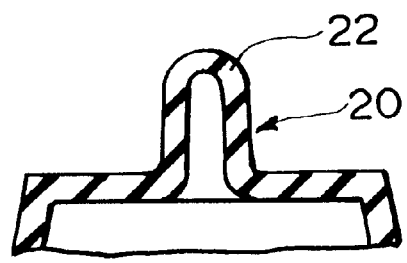
Figure 8A:
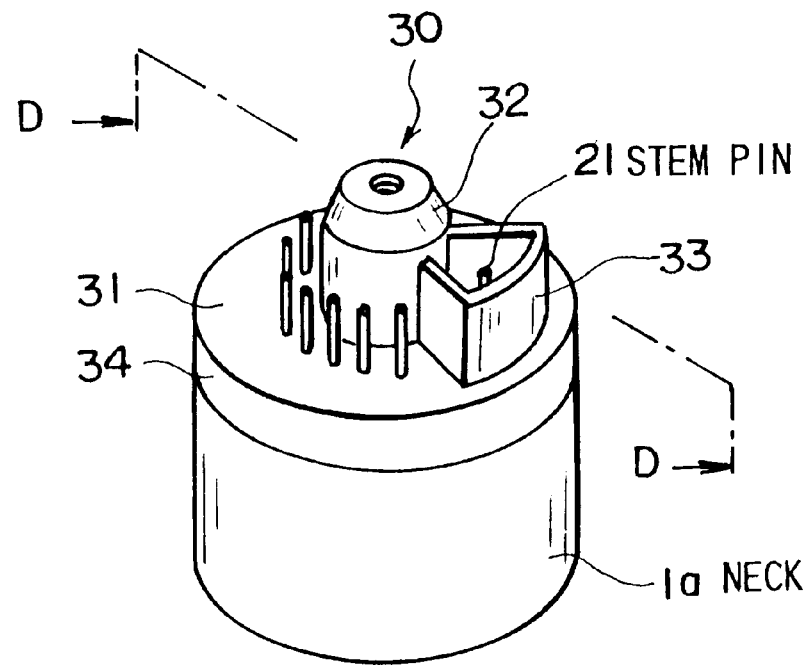
FIGS. 8A and 8B are views of the attaching step of the stem base to a stem, wherein FIG. BA is a perspective view
Figure 8B:
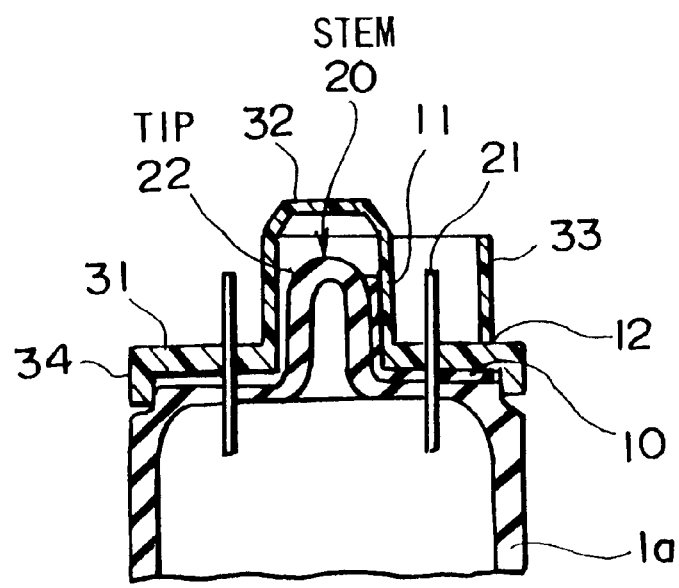

Then, the attaching step for attaching the stem base 30 to which the electrical insulator 10 is adhered to the stem is performed. FIGS. 8A and 8B are views of the state of the stem base 30 attached to the stem. FIG. 8A is a perspective view, while FIG. 8B is a sectional view along the line D—D in FIG. 8A. As a stem, one configured in the same way as in the related art shown in FIGS. 1B and 1C and attached to the neck 1a of the cathode ray tube 1 is used, so the same components are given the same reference numerals in FIGS. 8A and 8B and explanations thereof are omitted.

At the time of attaching the stem base 30 to the stem 20, the stem pins 21 of the stem 20 are inserted through the pin through holes 35 of the stem base 30 and the tip 22 is held in the tip holder 32. Also, high voltage use stem pins 21 are made to be held in the stem pin holder 33. After the attachment, the stem base 30 is bonded and secured to the stem 20 by heating. As a result of the above step, insulation is achieved between the high voltage use stem pins 21 on the stem 20 of the cathode ray tube 1.

In this way, in the present embodiment, since the electrical insulator 10 is obtained by transfer molding the insulator composition 10a, the disadvantage of material loss does not occur unlike the related art for obtaining an electrical insulator by using a die set or molding tool. Further, due to the transfer molding, the electrical insulator 10 can be easily produced in a shape matching with the complicated shapes of the stem 20 and stem base 30 of the cathode ray tube 1.

Further, at the time of adhering the electrical insulator 10 to the back of the base 31 of the stem base 30, since the folding portion 11 is arranged in a state extending from the positions of the pin through holes 35 to the tip holder 32 and since the folding portion 11 of the electrical insulator 10 extending to the tip holder 32 is folded to the inside surface of the tip holder 32 prior to attaching the stem base 30 to the stem 20, entrainment of air can be suppressed when attaching the stem base 30 to the stem 20. Accordingly, it is possible to prevent the insulation property between the stem pins 21 from declining due to the entrained air, therefore the electrical characteristics can be brought out 100 percent and a cathode ray tube 1 of a high reliability improved in the bonding strength of the stem 20 and the stem base 30 can be realized.

Below, examples and a comparative example will be explained.

EXAMPLE 1

0.5 part by weight of the bonding aid shown in the above formula (2) was added to 100 parts by weight of a silicone compound (75 parts by weight of methylvinyl polysiloxane comprised of 99.85 mol % of dimethylsiloxane and 0.15 mol % of methylvinylsiloxane and having an average polymerization degree of 8000 and 25 parts by weight of fumed silica surface treated by hexamethyl disilazane and having a specific surface area of 200 $m^2/g$), 1.3 parts by weight of p-methylbenzoyl peroxide was blended in as a vulcanization agent, and the mixture was kneaded by a twin-roll to obtain an insulator composition for a cathode ray tube. The Williams plasticity of the composition was 200.

This insulator composition was molded into the shape of FIG. 6 by transfer molding, whereupon an electrical insulator could be obtained without any material loss due to generation of waste etc. Subsequently, the adhering portion of the electrical insulator was adhered to the stem base, then the electrical insulator was pressed to straighten out its shape, the folding portion extending to the tip holder of the stem was folded to the inside surface of the tip holder, then the stem base was attached to the stem of the cathode ray tube, this was pressed by a pressing force of 1 MPa, and the entire cathode ray tube was heated in a heating chamber at 100° C. for 10 minutes to bond and secure the stem base to the stem to achieve insulation between the high voltage use stem pins. The bonding strength of the stem base to the stem at this time was a high 3 MPa. Further, voltage was applied across the high voltage use stem pins to test the insulation withstand voltage. As a result, the insulation breakdown voltage was 35 kV. There was no loss of the insulator composition.

EXAMPLE 2

1.0 part by weight of the bonding aid shown in the above formula (12) was added to 100 parts by weight of a silicone compound (76 parts by weight of methylvinyl polysiloxane comprised of 99.85 mol % of dimethylsiloxane and 0.15 mol % of methylvinylsiloxane and having an average polymerization degree of 8000, 20 parts by weight of fumed silica surface treated by hexamethyl disilazane and having a specific surface area of 200 $m^2/g$, 2 parts by weight of bengara, and 2 parts by weight of carbon black), 2 parts by weight of the cross-linking agent shown in the above formula (14), 0.01 part by weight of chloroplatinic acid as a platinum compound, and 0.005 part by weight of the control agent shown in the above formula (15) were blended in, and the mixture was kneaded by a twin-roll to obtain an insulator composition for a cathode ray tube. The Williams plasticity of the composition was 250.

This insulator composition was molded into the shape of FIG. 6 by transfer molding, whereupon an electrical insulator could be obtained without any material loss due to generation of waste etc. Subsequently, the adhering portion of the electrical insulator was adhered to the stem base, then the electrical insulator was pressed to straighten out its shape, the folding portion extending to the tip holder of the stem was folded to the inside surface of the tip holder, then the stem base was attached to the stem of the cathode ray tube, this was pressed by a pressing force of 1 MPa, and the entire cathode ray tube was heated in a heating chamber at 90° C. for 20 minutes to bond and secure the stem base to the stem to achieve insulation between the high voltage use stem pins. The bonding strength of the stem base to the stem at this time was a high 3.5 MPa. Further, voltage was applied across the high voltage use stem pins to test the insulation withstand voltage. As a result, the insulation breakdown voltage was 35 kV. There was no loss of the insulator composition.

COMPARATIVE EXAMPLE 2.0 parts by weight of γ-glycidoxypropyl-trimethoxysilane was added to 100 parts by weight of a silicone compound (75 parts by weight of methylvinyl polysiloxane comprised of 99.85 mol % of dimethylsiloxane and 0.15 mol % of methylvinylsiloxane and having an average polymerization degree of 8000 and 25 parts by weight of fumed silica surface treated by hexamethyl disilazane and having a specific surface area of 200 $m^2/g$), 1.5 parts by weight of 2,4-dichlorobenzoyl peroxide was blended in as a vulcanization agent, and the mixture was kneaded by a twin-roll to obtain an insulator composition for a cathode ray tube.

This insulator composition was processed into a tape shape having a thickness of 1 mm and width of 1.5 mm by an extruder and punched out to the shape of FIG. 6 using a punch to obtain an electrical insulator. The loss of the insulator composition was 40 percent. Subsequently, the adhering portion of the electrical insulator was adhered to the stem base, then the electrical insulator was pressed to straighten out its shape, the folding portion extending to the tip holder of the stem was folded to the inside surface of the tip holder, then the stem base was attached to the stem of the cathode ray tube, this was pressed by a pressing force of 1 MPa, and the entire cathode ray tube was heated in a heating chamber at 100° C. for 10 minutes to bond and secure the stem base to the stem to achieve insulation between the high voltage use stem pins. The bonding strength of the stem base to the stem at this time was a low 0.7 MPa. Further, voltage was applied across the high voltage use stem pins to test the insulation withstand voltage. As a result, the insulation breakdown voltage was 15 kV. A decline in the insulation property was seen comparing with the above Examples 1 and 2.

It was confirmed from the results of the above that, according to the method of insulating a cathode ray tube and the insulator composition for a cathode ray tube of the embodiments, it is possible to obtain an electrical insulator without loss of the insulator composition and possible to realize a cathode ray tube having an improved bonding strength of the stem and the stem base and an improved insulation property between the stem pins.

Summarizing the advantageous effects of the invention, as explained above, according to the method of insulating a cathode ray tube according to the present embodiment, since an electrical insulator is obtained by transfer molding of the electrical insulator composition, it is possible to produce an electrical insulator without loss by efficiently using the electrical insulator composition. Further, since it is possible to easily form an electrical insulator into a shape matching with the complex-shaped stem and stem base of a cathode ray tube by the transfer molding and further since the electrical insulator is adhered to the stem base in the state with the portion of the electrical insulator extending toward the tip holder is folded to the inside surface of the tip holder prior to attaching the stem base to the stem, it is possible to attach the stem base to the stem without air entrainment. Accordingly, a cathode ray tube wherein the stem and the stem base are strongly bonded and the insulation property between the high voltage use stem pins is high can be realized.

Further, according to the electrical insulator composition for a cathode ray tube according to the present invention, by using a silicone compound, it is possible to obtain an electrical insulator composition having a good releasability from a transfer mold, easy to be molded into a complex shape, easy to handle, and otherwise well suited to transfer molding and further having an excellent rubber strength, a property of curing at a suitable curing rate, and an excellent insulation property. Accordingly, this electrical insulator composition becomes extremely effective for realization of a cathode ray tube improved in the bonding strength of the stem and the stem base and improved in the insulation property between the high voltage use stem pins by working the method of insulating a cathode ray tube of the above invention.

Note that the present invention is not limited to the above embodiments and includes modifications within the scope of the claims.

What is claimed is:

1. A method of insulating a cathode ray tube for insulation between stem pins using an electrical insulator when attaching to a stem, which is provided at the cathode ray tube and has a tip and stem pins projecting therefrom, an insulating stem base, which comprises a base through which pin through holes are formed and has provided projecting from the front surface thereof a tip holder, in a state with the stem pins inserted through the pin through holes and the tip held in the tip holder, said method comprising the steps of:

molding an electrical insulator composition comprising an uncured self-adhesive silicone rubber into a predetermined sheet shape by using a transfer mold to obtain an electrical insulator, arranging the electrical insulator in a state extending from the positions of the pin through holes on the back of the base of the stem base to the tip holder and adhering it to the back of the base, folding back the portion of the electrical insulator extending to the tip holder to the inside surface of the tip holder, and attaching the stem base to the stem.

2. A method of insulating a cathode ray tube as set forth in claim 1, further comprising, between the step of adhering the electrical insulator and the step of folding back the extending portion of the electrical insulator, a step of pressing the electrical insulator to straighten out its shape.

* * * * *